US011916276B2

(12) United States Patent
Hancock et al.

(10) Patent No.: US 11,916,276 B2
(45) Date of Patent: Feb. 27, 2024

(54) CIRCULATOR CONDUCTOR AND HOUSING CONFIGURATION

(71) Applicant: SKYWORKS SOLUTIONS, INC., Irvine, CA (US)

(72) Inventors: Hugh Charles Hancock, Midleton (IE); James Gerard O'Callaghan, Cork (IE)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 0 days.

(21) Appl. No.: 17/815,272

(22) Filed: Jul. 27, 2022

(65) Prior Publication Data

US 2023/0030921 A1 Feb. 2, 2023

Related U.S. Application Data

(60) Provisional application No. 63/226,809, filed on Jul. 29, 2021.

(51) Int. Cl.

*H01P 1/387* (2006.01)
*H01P 1/383* (2006.01)
*H01P 1/36* (2006.01)

(52) U.S. Cl.

CPC .............. *H01P 1/383* (2013.01); *H01P 1/387* (2013.01); *H01P 1/36* (2013.01)

(58) Field of Classification Search

CPC .. H01P 1/387; H01P 1/38; H01P 1/383; H01P 1/393; H01P 1/32; H01P 1/36; H01P 1/37; H01P 1/375; H01P 1/215; H01P 1/217; H01P 1/218

See application file for complete search history.

(56) References Cited

U.S. PATENT DOCUMENTS

2013/0321090 A1 12/2013 Cruickshank et al.
2016/0148732 A1 5/2016 Cruickshank et al.

FOREIGN PATENT DOCUMENTS

JP 2008053847 A * 3/2008 .............. H01P 1/383

* cited by examiner

*Primary Examiner* — Stephen E. Jones
(74) *Attorney, Agent, or Firm* — Lando & Anastasi, LLP

(57) ABSTRACT

A circulator comprising a grounding plane including a first side and a second side, a magnet disposed on the first side of the grounding plane, a ferrite-based disk disposed on the second side of the grounding plane, and a conductor disposed on a side of the ferrite-based disk opposing the grounding plane. The conductor includes an elongate portion and the elongate portion has a distal end section projecting inwardly adjacent to a side of the magnet opposing the grounding plane. The circulator comprises a circulator housing including a plurality of side portions. The side portions have a first section and a second section, the second section extending further around a periphery of the housing than the first section such that a gap between neighboring first sections is wider than a gap between neighboring second sections.

26 Claims, 12 Drawing Sheets

CIRCULATOR CONDUCTOR AND HOUSING CONFIGURATION

CROSS-REFERENCE TO RELATED APPLICATIONS

This application claims priority under 35 U.S.C. § 119(e) to U.S. Provisional Patent Application Ser. No. 63/226,809, titled "CIRCULATOR CONDUCTOR AND HOUSING CONFIGURATION," filed Jul. 29, 2021, the entire contents of which is incorporated herein by reference for all purposes.

BACKGROUND

Field

Aspects and embodiment disclosed herein relate to a circulator having an improved conductor configuration and an improved circulator housing.

Description of the Related Technology

In radio-frequency (RF) applications, junction ferrite devices such as circulators can be utilized to, for example, selectively route RF signals between an antenna, a transmitter, and a receiver. If an RF signal is being routed between the transmitter and the antenna, the receiver preferably should be isolated. Accordingly, a circulator is sometimes also referred to as an isolator; and such an isolating performance can represent the performance of the circulator.

SUMMARY

According to one embodiment there is provided, a circulator. The circulator comprises a grounding plane including a first side and a second side, a magnet disposed on the first side of the grounding plane, a ferrite-based disk disposed on the second side of the grounding plane, and a conductor disposed on a side of the ferrite-based disk opposing the grounding plane, the conductor including an elongate portion, the elongate portion having a distal end section projecting inwardly adjacent to a side of the magnet opposing the grounding plane.

In one example the conductor may be configured to exert a force on the magnet in a direction towards the ferrite-based disk.

In one example the distal end section of the elongate portion of the conductor may be bent such as to exert the force on the magnet.

In one example the magnet may include an electrically insulating portion.

In one example the magnet may have no electrical conductivity such as to form the electrically insulating portion.

In one example the magnet may include a ring of electrically non-conductive material disposed around a periphery of the magnet such as to form the electrically insulating portion.

In one example the electrically non-conductive material may be a dielectric, ceramic or high-temperature plastic.

In one example the magnet may include a layer of electrically insulating material disposed on a side of the magnet opposing the ferrite-based disk such as to form the electrically insulating portion.

In one example the layer of electrically insulating material may be a shim.

In one example the layer of electrically insulating material may be a ceramic or high-temperature material.

In one example the bent distal end section of the elongate portion of the conductor may be configured to be in contact with the electrically insulating portion of the magnet such as to exert the force on the magnet.

In one example the circulator may further comprise a part at the distal end section of the elongate portion of the conductor located adjacent to the side of the magnet opposing the grounding plane such as to exert the force on the magnet.

In one example the part may be a block.

In one example the part may be an electrical insulator.

In one example the part may include a high-temperature material.

In one example the distal end section of the elongate portion may be wrapped around a portion of the part.

In one example the configuration to exert the force on the magnet exerts a force on a printed circuit board in a direction opposing the force on the magnet.

In one example the ferrite-based disk may include a ring of dielectric material disposed around a periphery of the ferrite-based disk.

In one example the circulator may further comprise a second ferrite-based disk disposed on a side of the conductor opposing the ferrite-based disk disposed on the second side of the grounding plane.

In one example the circulator may further comprise a second grounding plane disposed on a side of the second ferrite-based disk opposing the conductor.

In one example the circulator may further comprise a second magnet disposed on a side of the second grounding plane opposing the second ferrite-based disk.

In one example the elongate portion of the conductor may be configured to bend such that its distal end section projects inwardly adjacent to a side of the magnet opposing the grounding plane.

According to another embodiment there is provided a circulator. The circulator comprises a grounding plane including a first side and a second side, a magnet disposed on the first side of the grounding plane, a ferrite-based disk disposed on the second side of the grounding plane, a conductor disposed on a side of the ferrite-based disk opposing the grounding plane, the conductor including an elongate portion, the elongate portion having a distal end section projecting inwardly adjacent to a side of the magnet opposing the grounding plane, and a circulator housing including a plurality of side portions, the plurality of side portions having a first section and a second section, the second section extending further around a periphery of the housing than the first section such that a gap between neighboring first sections is wider than a gap between neighboring second sections.

In one example a width of the gap between neighboring first sections may be between 20% and 37% of a diameter of the housing.

In one example the gap between neighboring second sections may have a width between 0.35 mm and 0.5 mm.

In one example the gap between neighboring first sections may have a greater width than a width of the elongate portion of the conductor.

In one example the elongate portion of the conductor may be disposed between neighboring first sections.

In one example the gap between neighboring second sections may have a smaller width than the width of the elongate portion of the conductor.

In one example the circulator may further comprise a second magnet arranged adjacent to the second side of the grounding plane.

In one example the second sections of the side portions may extend around a periphery of the second magnet.

In one example the circulator housing may further include a base.

In one example the distal end section of the elongate portion of the conductor may be configured to span a height of the base of the housing.

According to another embodiment there is provided, a circulator housing. The circulator housing comprises a plurality of side portions, the side portions including a first section and a second section, the second section extending further around a periphery of the housing than the first section such that a gap between neighboring first sections is wider than a gap between neighboring second sections.

In one example the circulator housing further comprises a base.

In one example the circulator housing further comprises a cover.

In one example the side portions are configured to fold over at least part of the cover such as to secure a circulator disposed within the housing.

In one example the side portions are curved.

In one example the housing is made from cold rolled steel.

In one example the housing is manufactured using progressive die stamping.

According to another embodiment there is provided a method of assembling a circulator. The method comprises arranging a pre-assembled circulator assembly within a circulator housing, the circulator assembly including a conductor having an elongate portion, the housing including a plurality of side portions having a first section and a second section, the second section extending further around a periphery of the housing than the first section such that a gap between neighboring first sections is wider than a gap between neighboring second sections, the circulator assembly being arranged such that the elongate portion of the conductor is disposed between neighboring first sections of the side portions, and the side portions being configured to bend, disposing a cover on the circulator assembly such that the side portions of the housing border a periphery of the cover, and bending the side portions such that they fold over at least part of the cover, securing the circulator assembly and cover within the housing.

In one example the pre-assembled circulator assembly further comprises a pair of ferrite-based disks disposed between a pair of magnets and a pair of grounding planes.

In one example the side portions may be bent using a press.

In one example the housing may be manufactured using progressive die stamping.

In one example the housing may be made from cold rolled steel.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments described herein are directed to a circulator having improved electrical performance, improved manufacturability and reduced manufacturing costs.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

In some implementations, junction ferrite devices such as circulators are passive devices utilized in radio-frequency (RF) applications to, for example, selectively route RF signals between an antenna, a transmitter, and a receiver. If a signal is being routed between the transmitter and the antenna, the receiver preferably should be isolated. Accordingly, a circulator is sometimes referred to as an isolator; and such an isolating performance can represent the performance of the circulator.

Figure 1A:
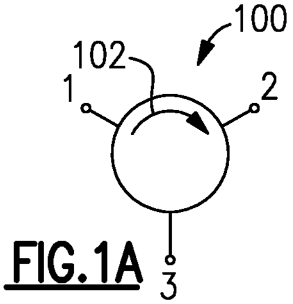
FIG.1A (PRIOR ART)
FIGS. 1A and 1B schematically depict examples of 3-port and 4-port circulators.
Figure 1B:
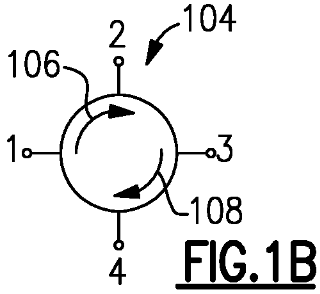
FIG.1B (PRIOR ART)

In some embodiments, a circulator can be a passive device having three or more ports (e.g. ports for an antenna, transmitter and receiver). FIGS. 1A and 1B schematically show an example of a 3-port circulator 100 and a 4-port circulator 104. In the example 3-port circulator 100, a signal is shown to be routed (arrow 102) from port 1 to port 2; and port 3 can be substantially isolated from such a signal. In the example 4-port circulator 104, a signal is shown to be routed (arrow 106) from port 1 to port 2; and another signal is shown to be routed (arrow 108) from port 3 to port 4. The two junctions of the signal paths in the example of FIG. 1B can be substantially isolated from each other. Other configurations of 3 and 4-port circulators, as well as circulators having other numbers of ports, can also be implemented.

In some implementations, a circulator can be based on ferrite materials. Ferrites are magnetic materials having very high ohmic resistance. Accordingly, ferrites have little or no eddy current when subjected to changing magnetic fields, and are therefore suitable for RF applications.

Ferrites can include Weiss domains, where each domain has a net non-zero magnetization. When there is no external magnetic field influencing a ferrite object, the Weiss domains are oriented substantially randomly, so that the ferrite as a whole has a net magnetization of approximately zero.

If an external magnetic field of sufficient strength is applied to the ferrite object, the Weiss domains tend to align along the direction of the external magnetic field. Such a net magnetization can influence how an electromagnetic wave propagates within the ferrite object.

Figure 2A:
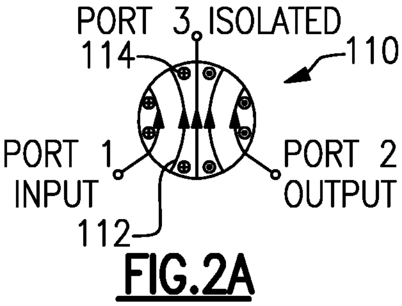
FIG.2A (PRIOR ART)
FIGS. 2A and 2B show examples of magnetic fields that can be applied to the example circulators of FIGS. 1A and 1B to achieve desired routing functionalities.
Figure 2B:
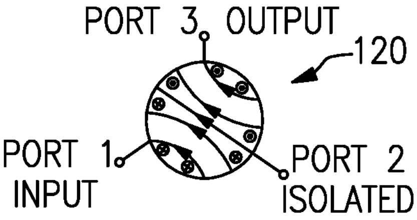
FIG.2B (PRIOR ART)

For example, and as depicted in FIGS. 2A and 2B, suppose that a circular disk-shaped ferrite object 110 is subjected to a substantially static external magnetic field along the axis (perpendicular to the plane of paper) of the disk. In the absence of such an external field (not shown), an RF signal input into Port 1 and propagating perpendicular to the disk axis splits into two rotating waves with a substantially same propagation speed. One wave rotates clockwise around the disk, and the other counterclockwise around the disk, so as to yield a standing wave pattern. If Ports 2 and 3 are positioned equally spaced azimuthally relative to Port 1 (about 120 degrees from each other), the standing wave pattern results in approximately half of the incoming wave leaving each of Ports 2 and 3.

In the presence of such an external magnetic field, the propagation speeds of the two rotating waves are no longer the same. Because of the difference in the propagation speeds, the resulting standing wave pattern can yield a situation where substantially all of the energy of the incoming wave is passed to one of the two ports while the other port is substantially isolated.

For example, FIG. 2A shows a configuration where the axial static magnetic field (not shown) yields a rotated standing wave pattern relative to the incoming wave propagation direction (along Port 1). Examples of electric field lines corresponding to such a standing wave pattern are depicted as 112 (along a plane of the disk) and 114 (along the axis of the disk). The example rotated standing wave pattern results in a substantial null in electric field strength at Port 3, thereby yielding substantial isolation of Port 3. On the other hand, Port 2 is depicted as having a similar (inverted) wave pattern as that of the input at Port 1, and therefore energy is transmitted from Port 1 to Port 2.

FIG. 2B shows another example where an axial static magnetic field (not shown) yields a standing wave pattern, such that a wave input through Port 1 is passed to Port 3 as an output, and Port 2 is substantially isolated. In some implementations, the two rotated standing wave patterns can be achieved by providing magnetic fields that are higher and lower than a field value that results in a resonance in the precession of ferrite domains.

Figure 3:
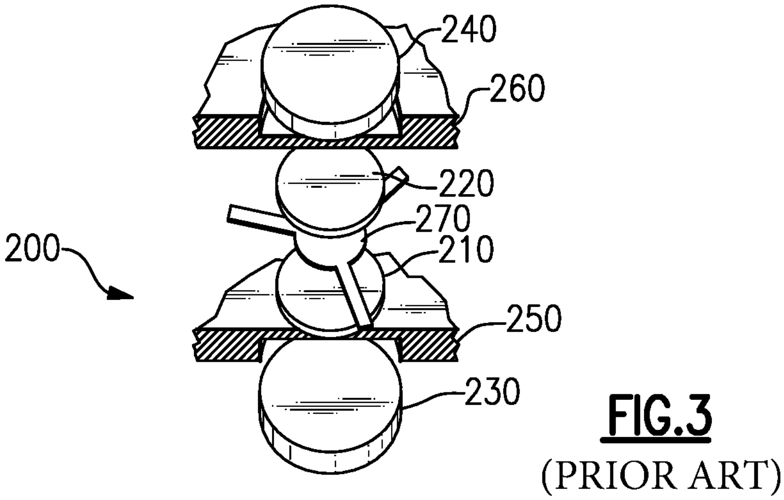
FIG.3 (PRIOR ART)
FIG. 3 is an exploded view of an example known circulator assembly.
Figure 4A:
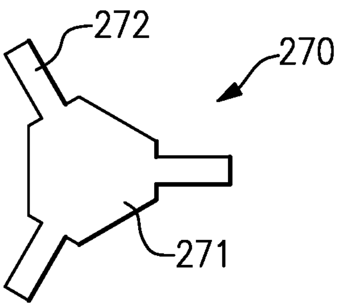
FIG.4A (PRIOR ART)
FIGS. 4A to 4F schematically depict examples of known conductor geometries.
Figure 4B:
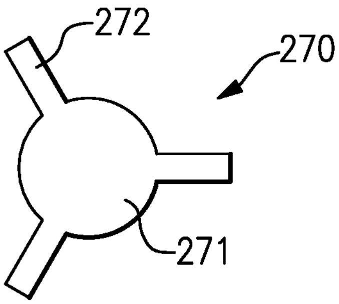
FIG.4B (PRIOR ART)
Figure 4C:
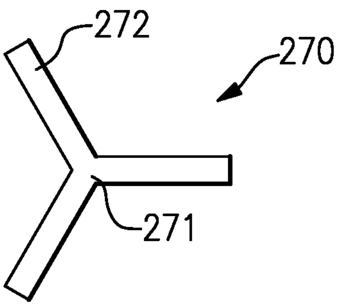
FIG.4C (PRIOR ART)
Figure 4D:
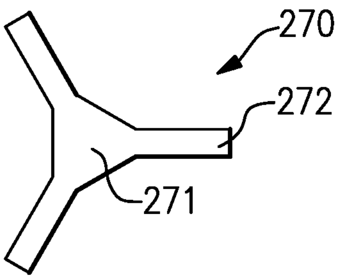
FIG.4D (PRIOR ART)
Figure 4E:
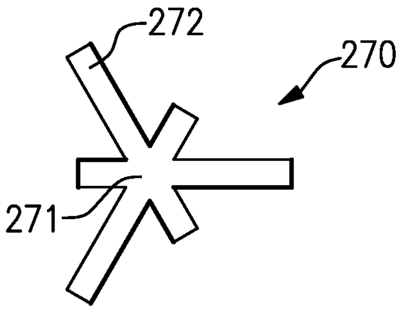
FIG.4E (PRIOR ART)
Figure 4F:
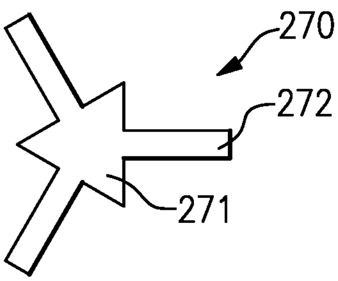
FIG.4F (PRIOR ART)

FIG. 3 shows an example known circulator assembly 200. The assembly 200 comprises a pair of ferrite-based disks 210, 220 disposed between a pair of magnets 230, 240. In some implementations, each ferrite-based disk 210, 220 comprises a ring of high relative dielectric material disposed around a periphery of the disk. The dielectric ring surrounds a ferrite disk, forming a ferrite/dielectric assembly. The dielectric provides a non-magnetic gap between the ferrite and the return path magnetic field to improve intermodulation distortion reduction performance over a configuration where the ferrite disk extends further out to the return path. A first magnet 230 is disposed on a first side of a first grounding plane 250 and a first ferrite-based disk 210 is disposed on a second side of the first grounding plane 250. The circulator assembly 200 further comprises a second ferrite-based disk 220 disposed on a first side of a second grounding plane 260 and a second magnet 240 disposed on a second side of the second grounding plane 260. The magnets 230, 240 arranged in the foregoing manner can yield generally axial field lines through the ferrite-based disks 210, 220. The circulator assembly 200 further comprises a conductor 270 (also referred to herein as a circuit, a center conductor and an inner flux conductor, with the term flux referring to magnetic flux). The conductor 270 is configured to function as a resonator and to match networks to the ports.

Referring to FIGS. 4A to 4F, the geometry of the conductor 270 is requirement-specific and is chosen to achieve a certain performance. However, the example geometries shown in FIGS. 4A to 4F all share the feature of a central section 271 from which a plurality of elongate portions 272 extend, said elongate portions 272 corresponding to the ports of the circulator. The geometry of the section 271 of the conductor 270 from which the elongate portions 272 extend differs in each of FIGS. 4A to 4F to correspond to the required performance of the circulator.

Figure 5:
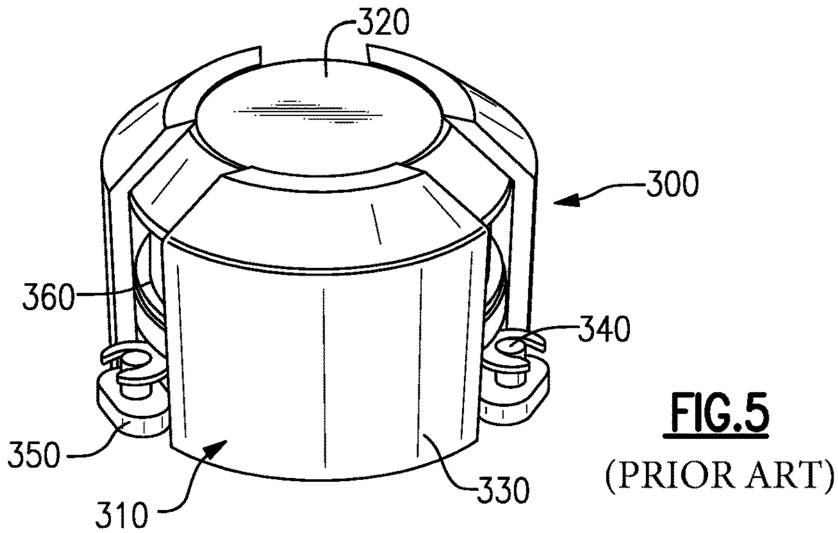
FIG.5 (PRIOR ART)
FIG. 5 is an example known circulator.

FIG. 5 shows an example known circulator 300. The circulator 300 comprises a housing 310 in which a circulator assembly 200 is disposed. The housing 310 is configured to enclose and protect the circulator assembly 200. For example, the housing 310 comprises a cover 320 and a plurality of curved side portions 330. To manufacture the housing 310, the components of the housing 310 are stamped from sheet metal.

To form part of a wider electrical device, the circulator 300 is mounted on a printed circuit board (PCB) (not shown). To facilitate connecting the circulator 300 to the PCB, the housing 310 comprises a plurality of pins 340 located in a pin frame 350. The pin frame 350 extends beyond the side portions 330 (also referred to herein as the casing) of the housing 310 to receive said pins 340. The pins 340 are configured to be in electrical contact with the PCB. Instead of comprising a pin frame 350, the housing 310 can comprise an alternative configuration to retain pins 340. For example, the pins may simply be slotted into the housing 310 of the circulator 300. An electrical connection between the circulator 300 and the PCB is established via the pins 340 and the conductor 270 of the circulator assembly 200. For example, the conductor or circuit 270 can be soldered onto the pins 340 by way of the elongate portions 272 of the conductor 270.

To accommodate the portions of the pin frame 350 that extend beyond the side portions 330 of the housing 310, the side portions 330 are separated by gaps 360.

Figure 6:
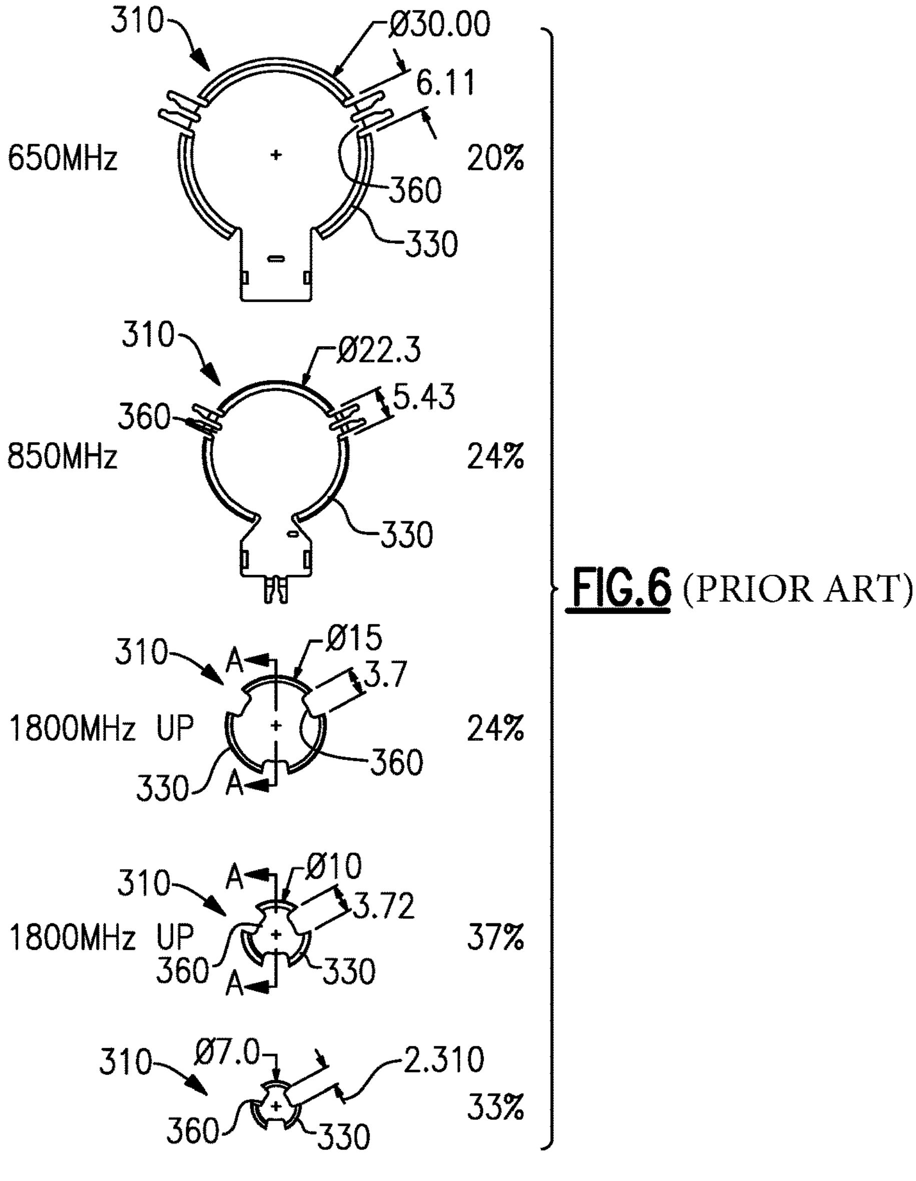
FIG.6 (PRIOR ART)
FIG. 6 schematically depicts examples of known circulator housings, the frequencies at which they operate, their diameters, the width of the gaps separating neighboring side portions of the housing, and the width of said gaps expressed as a percentage of the diameter of the housing.

Referring to FIG. 6, the dimensions of the gaps 360 are dependent on the dimensions of the housing 310. The dimensions of the housing 310 are determined by the frequency at which the circulator will operate. Lower frequency circulators 300, such as those at 650 MHz, generally have a larger housing 310 and, therefore, larger gaps 360. Higher frequency circulators 300, such as those working at 5 GHz, have a smaller diameter and, therefore, smaller gaps 360. For known housings 310, the width of the gaps 360 separating neighboring side portions 330 falls within the range of 20% to 37% of the diameter of the housing 310, as shown in FIG. 6. The gaps 360 are sufficiently wide to both accommodate the portions of the pin frame 350 that extend beyond the side portions 330 of the housing 310 and to allow portions of the conductor 270, such as the elongate portions 272, to project through the gaps 360 and establish an electrical connection with the pins 340.

Referring back to FIG. 5, the gaps 360 span the height of the circulator 300 such that components of the circulator assembly 200 within the housing 310 are exposed. One such component is the top magnet 240. These gaps 360 permit the magnetic field to exit the circulator 300, which in turn increases the risk of attraction between units on a PCB when the circulator 300 forms part of a wider electrical device. The risk is further increased when attempting to reduce the size of electronic devices by decreasing the size of the units on the PCB and locating the units closer together. During manufacturing, the magnets 230, 240 in circulators 300 can cause circulator units to attract before they are soldered onto the PCB. Magnetic isolation between units is, therefore, important as they can be closely located on a PCB. Should there be sufficient magnetic attraction during reflow soldering, units may move from their correct placement, causing issues during manufacturing. Some known solutions to this problem include thicker housing walls to contain the magnetic field and the use of lower magnetization ferrites that do not require such a strong magnet for biasing. Using a lower magnetization ferrite, however, will generally reduce bandwidth and decrease intermodulation performance.

According to some aspects of the present disclosure, a circulator assembly with an improved conductor configuration and an improved housing structure is provided.

Figure 7:
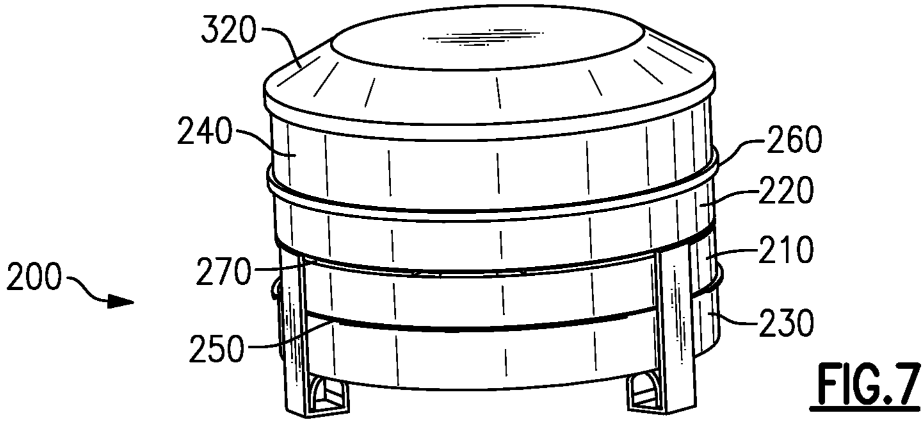
FIG. 7 is an example circulator assembly according to aspects of the present disclosure and a housing cover.

FIG. 7 shows an example circulator assembly 200 according to aspects of the present disclosure. The circulator assembly 200 broadly comprises the same elements as those of known circulator assemblies (see FIG. 3). Namely, a first magnet 230 is disposed on a first side of a first grounding plane 250 and a first ferrite-based disk 210 is disposed on a second side of the first grounding plane 250. The circulator assembly 200 further comprises a second ferrite-based disk 220 disposed on a first side of a second grounding plane 260 and a second magnet 240 disposed on a second side of the second grounding plane 260. The circulator assembly 200 further comprises an inner flux conductor 270 disposed between the two ferrite-based disks 210, 220. The configuration of the conductor 270 is significant and is shown in more detail in FIG. 8.

Figure 8:
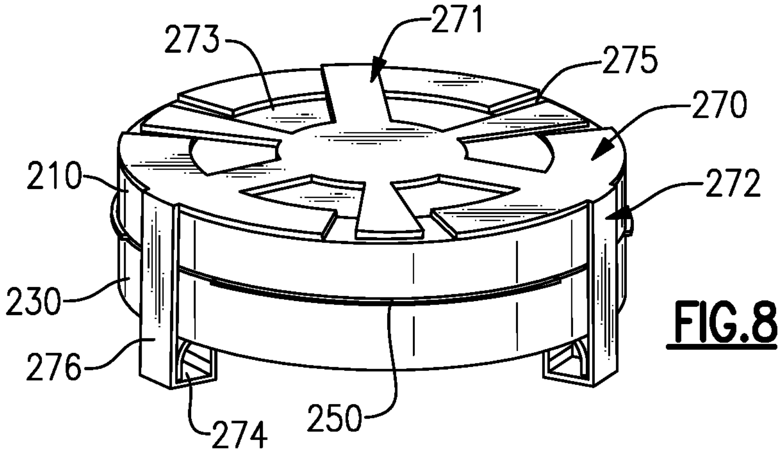
FIG. 8 is part of the circulator assembly shown in FIG. 7.

Referring to FIG. 8, the conductor 270 is generally a disk 271 including a plurality of elongate portions 272 extending from it. In this example, there are three elongate portions 272 spaced evenly around the periphery of the disk 271. The surface of the disk 271 includes a plurality of through holes 273 spaced apart around the disk 271 in a circumferential direction. The through holes 273 extend through the periphery of the disk 271 to each form a gap 275 in the periphery of the disk 271. There are twice as many through holes 273 as elongate portions 272. Thus, in this example, there are six through holes 273. The gaps 275 in the periphery are located between elongate portions 272. There is a pair of gaps 275 between each elongate portion 272. The elongate portions 272 each include a main body portion 276. Each main body portion 276 extends from the periphery of the disk 271. The main body portions 276 are spaced apart evenly around the disk 271. The main body portion 276 of each elongate portion 272 extends perpendicular to the plane of the disk's surface. Each elongate portion 272 has a distal end section (also referred to herein as a pin) 274 of the elongate portion 272 that projects inwardly towards the circulator assembly 200 adjacent to a side of the magnet 230 opposing the first grounding plane 250. The distal end section 274 projects perpendicular to the elongate main body portion 276. The main body portion 276 of each elongate portion 272 of the conductor 270 spans at least part of the height or depth of the circulator assembly 200. The elongate portions 272 have a length to form an electrical connection from a distal end section 274 to a PCB. Thus, the elongate portions 272 are configured to establish electrical contact between a circulator comprising a circulator assembly 200 and a PCB on which the circulator is mounted to form part of a wider electrical device. Although the circulator assembly 200 in this example has a conductor 270 of the geometry described above, the geometry of the conductor 270 is requirement specific, as described above with reference to FIGS. 4A to 4F. The conductor 270 could, therefore, have one of a number of geometries, including those shown in FIGS. 4A to 4F.

Figure 9:
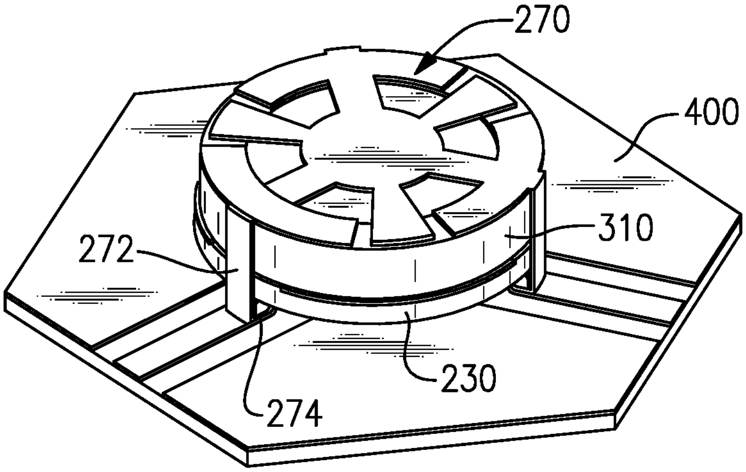
FIG. 9 is the part of the circulator assembly of FIG. 8 disposed on a printed circuit board (PCB)
Figure 10:
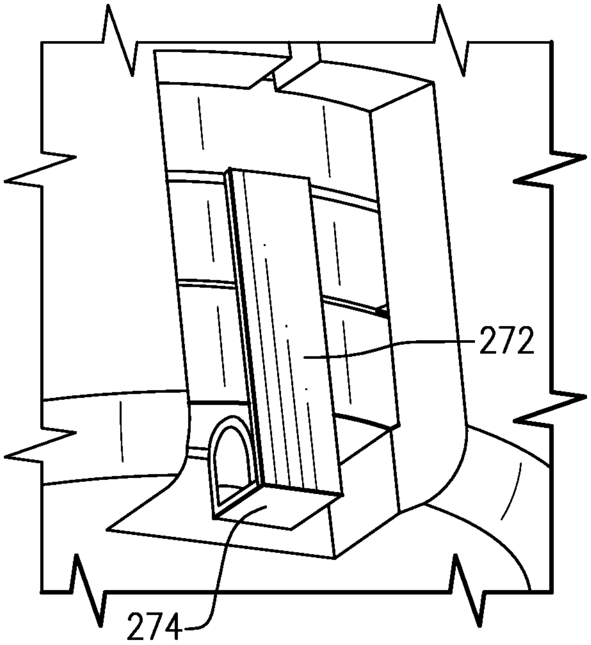
FIG. 10 is an example portion of a circulator according to aspects of the present disclosure including the circulator assembly of FIGS. 7 to 9.
Figure 11:
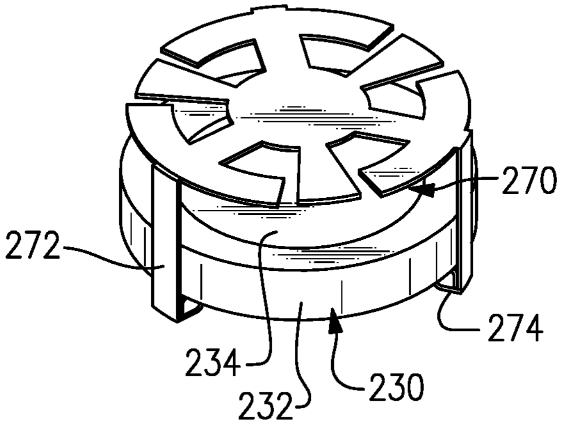
FIG. 11 is part of the circulator assembly shown in FIG. 10.
Figure 12:
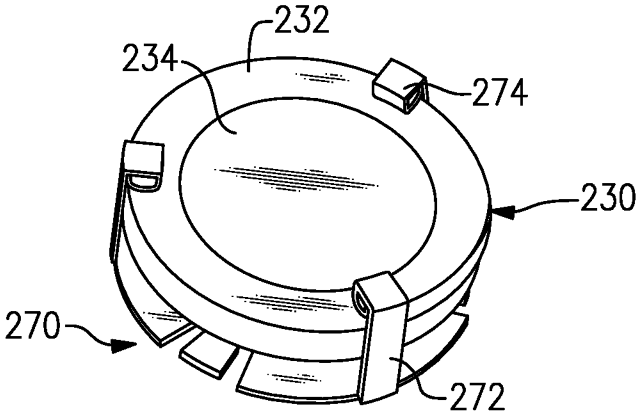
FIG. 12 is the part of the circulator assembly shown in FIG. 11 from a different perspective.
Figure 13:
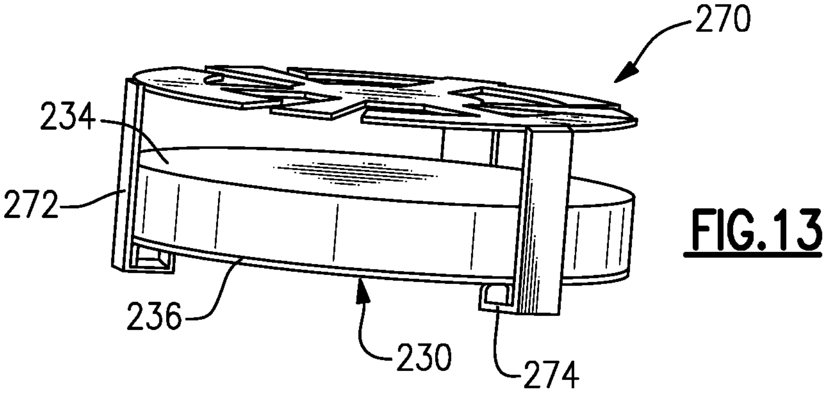
FIG. 13 is a part of the circulator assembly shown in FIG. 8 according to aspects of the present disclosure.

In FIG. 9, an example circulator assembly 200 is shown mounted on a PCB 400. To connect the circulator assembly 200 to the PCB 400 and maintain electrical contact, the elongate portions 272 of the conductor 270 are soldered to the PCB 400. The number of elongate portions 272 correspond to the number of ports of the circulator. In this example, as mentioned above, there are three elongate portions 272 and the circulator is a three-port circulator.

To establish a good electrical connection with the PCB 400, the distal end sections 274 of the elongate portions 272 of the conductor 270 are configured to exert a force on the first magnet 230 in a direction towards the first ferrite-based disk 210. When disposed on a PCB 400, this also leads to an opposite force being exerted on the PCB 400. In this way, part of the elongate portions 272 of the conductor 270 are pushed down onto the PCB 400 to provide good electrical contact.

FIGS. 10 to 14 show example configurations implemented to exert the force between the magnet 230 and the PCB 400. In the example depicted in FIG. 10, the distal end sections 274 of the elongate portions 272 are bent such as to exert the force. In other words, the circuit 270 is wrapped around to create a transition 274 between the circuit 270 and the PCB 400, with the circuit 270 and the edge transitions being integral or formed as one piece. In this example, the portion of the magnet 230 with which the distal end section 274 of the conductor 270 makes contact is an electrical insulator. This ensures that a short circuit to ground is not caused. In other words, when the pin 274 is wrapped around, the material above the pin 274 is an insulator. There are a number of configurations that may be implemented to achieve this. In one example, the circulator assembly 200 comprises a magnet 230 that is not metal plated and has no electrical conductivity. In the example shown in FIGS. 11 and 12, the magnet 230 comprises a ring of electrically non-conductive material 232. The material withstands high temperatures such that it does not melt when the elongate portion 272 is soldered onto the PCB 400. The material is, for example, a dielectric, ceramic or high-temperature plastics. The ring of electrically non-conductive material 232 is disposed around a periphery of a disk of electrically conductive magnet 234. The magnet 234 (conducting material), therefore, does not extend out across the entire diameter of the casing 330. The distal end sections 274 of the elongate portions 272 of the conductor 270 are configured to only make contact with the electrically non-conductive material 232 and do not make contact with the electrically conductive magnet 234, such that there is no short circuit. In the example shown in FIG. 13, the magnet 230 comprises a disk of electrically conductive material 234 (magnet) and a layer of electrically insulating material 236 (also referred to herein as an electrically insulating spacer) disposed on a side of the disk of electrically conductive material 234 opposing the ferrite-based disk 210. In this example, the electrically insulating spacer 236 is a shim. As above, the material from which the shim 236 is made withstands high temperatures such that it does not melt when the elongate portion 272 is soldered onto the PCB 400. The shim 236 is, for example, made of a ceramic or a high temperature material like polytetrafluoroethylene, such as Teflon® synthetic polytetrafluoroethylene. The distal end sections 274 of the elongate portions 272 of the conductor 270 only make contact with the electrically insulating shim 236 such that the elongate portions 272 are electrically isolated from any conductive material.

Figure 14:
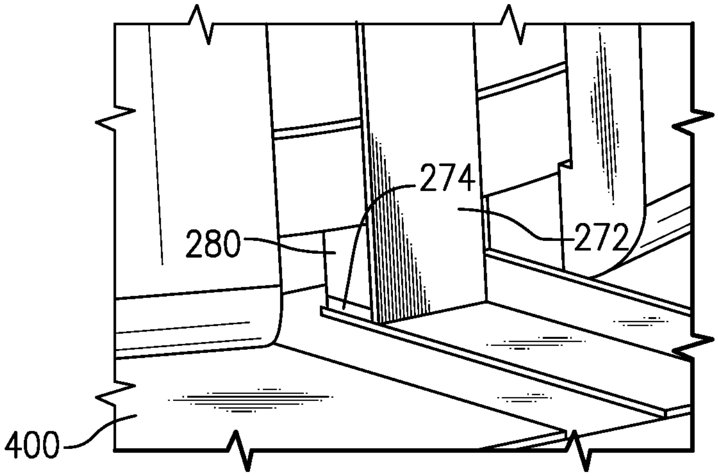
FIG. 14 is an example portion of a circulator according to aspects of the present disclosure including the circulator assembly of FIGS. 7 to 9.

In the example depicted in FIG. 14, the circulator assembly 200 further comprises a part 280 at the distal end section 274 of the elongate portion 272 located adjacent to the side of the magnet 230 opposing the grounding plane 250 such as to exert the force. The part 280 is a block. The distal end section 274 of the elongate portion 272 is wrapped around the block 280. This ensures a connection between the center conductor 270 and the PCB 400. The material can withstand high temperatures such that it does not melt when the elongate portion 272 is soldered onto the PCB 400. The material is also an insulating material, such that the distal end section 274 of the elongate portion 272 is not in contact with an electrically conductive portion of the magnet 230. This ensures a short circuit is not caused, as explained above. The block 280 is, for example, a high-temperature material, such as a ceramic or an engineering plastic.

The example circulator described above is easy to manufacture. This is because the elongate portions 272 of the conductor 270 are configured to establish electrical connection with a PCB 400. The circuit 270 wraps around a stack of circulator assembly 200 components (including the ferrite-based disk 210) to create this transition between the PCB and resonator (circuit). The need for pins 340 and/or a pin frame 350 is, therefore, eliminated. This reduces manufacturing costs.

Figure 15:
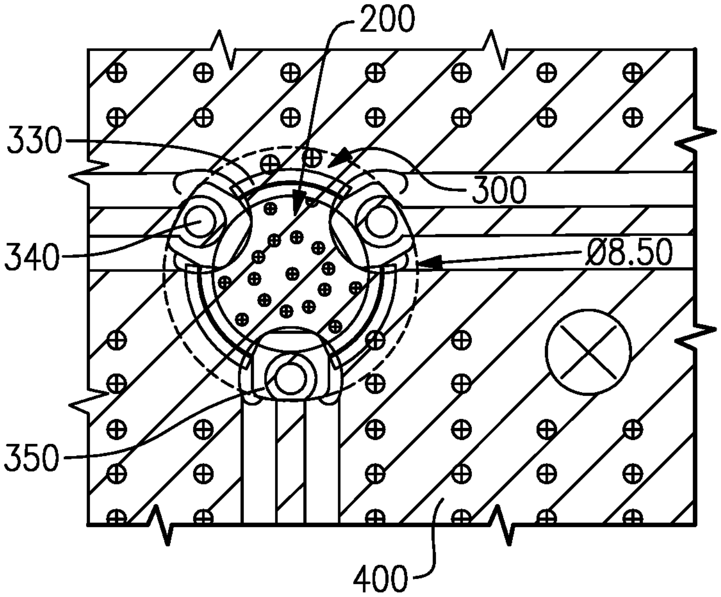
FIG.15 (PRIOR ART)
FIG. 15 schematically depicts the PCB land area occupied by a known circulator.
Figure 16:
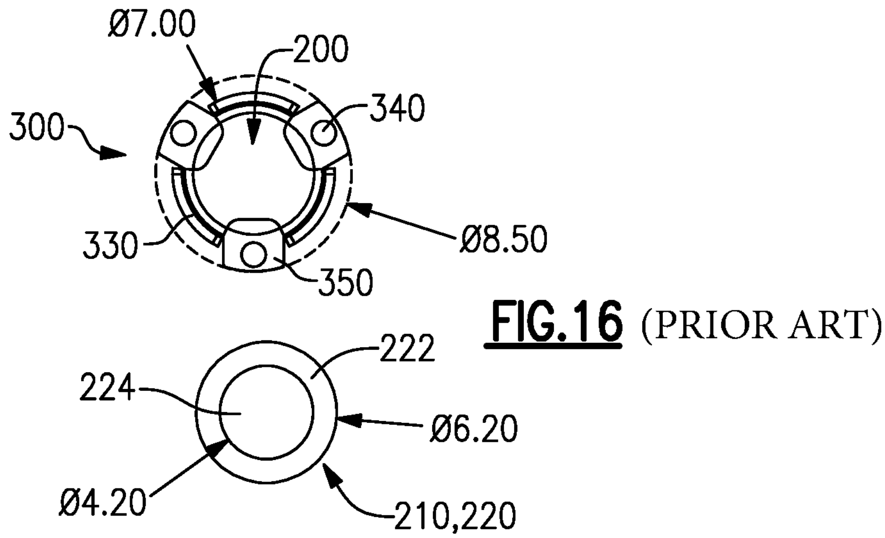
FIG.16 (PRIOR ART)
FIG. 16 schematically depicts the circulator shown in FIG. 15 and its associated ferrite/dielectric assembly.
Figure 17:
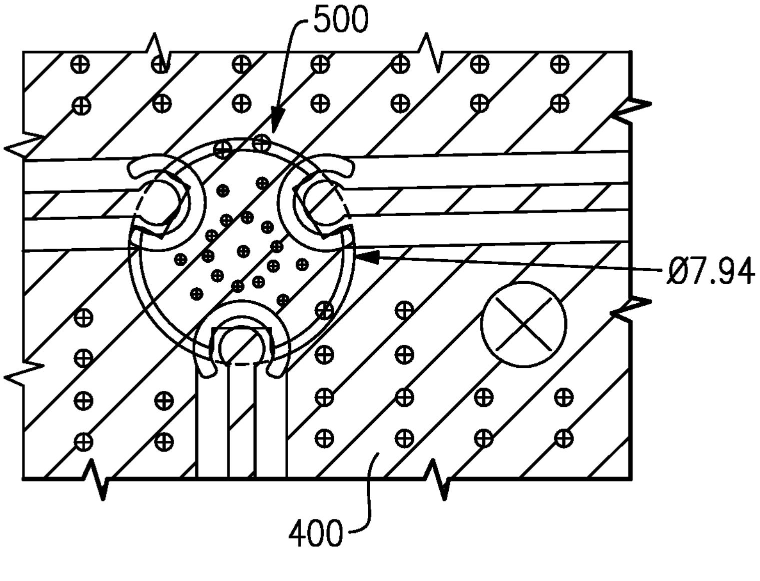
FIG. 17 schematically depicts the PCB land area occupied by a circulator comprising the circulator assembly of FIGS. 7 to 9.
Figure 18:
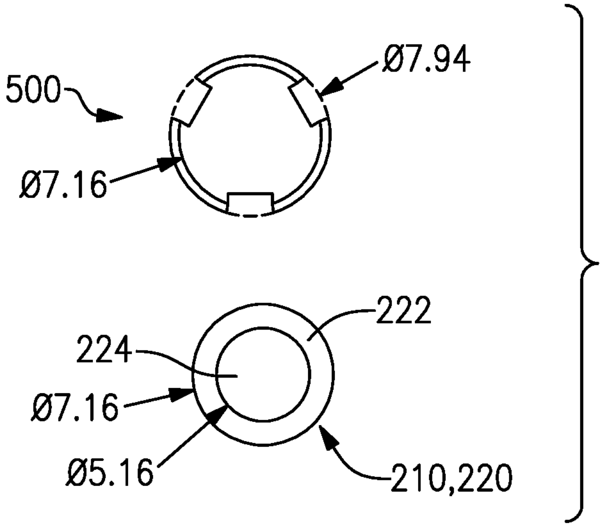
FIG. 18 schematically depicts the circulator shown in FIG. 17 and its associated ferrite/dielectric assembly.

The example circulator described above has good electrical performance as explained below. It is desirable to have small circulators/isolators such that they occupy less land space on a PCB in part of a wider electrical device. Reducing the size of the circulator and, therefore, its housing necessitates reducing the size of the ferrite/dielectric assemblies 210, 220. Reducing the size of the ferrite/dielectric assemblies 210, 220, is considered to reduce the electrical performance of a circulator. For the purpose of electrical performance, it is, therefore, desirable to have the largest sized ferrite/dielectric assemblies 210, 220 possible for a given housing/PCB land pattern. The removal of pins 340 from the housing 310 design allows for larger ferrite/dielectric assemblies 210, 220 for a given land pattern. Referring to FIGS. 15 and 16 that show known arrangements, FIG. 15 shows the diameter of the area on a PCB 400 occupied by the known circulator 300, and FIG. 16 shows the diameter of the ferrite/dielectric assemblies 210, 220 within the housing 310. Each ferrite/dielectric assembly 210, 220 comprises a ring of dielectric material 222 around a ferrite disk 224. The circulator 300 occupies a diameter of 8.5 mm on the PCB 400 and has a ferrite/dielectric assembly diameter of 6.2 mm. FIGS. 17 and 18 show corresponding diagrams for an example improved circulator 500 according to aspects of the present disclosure. The circulator 500 with the improved conductor configuration according to aspects of the present disclosure occupies a significantly smaller diameter of 7.94 mm on the PCB 400 and has a significantly larger ferrite/dielectric assembly diameter of 7.16 mm. The circulator 500 thus has both a smaller PCB footprint and houses larger ferrite/dielectric assemblies 210, 220 (15% increase in ferrite/dielectric assembly diameter in this specific example). In other words, the ferrite/dielectric assembly diameter relative to the PCB footprint of the housing is increased, improving electrical performance.

Figure 19:
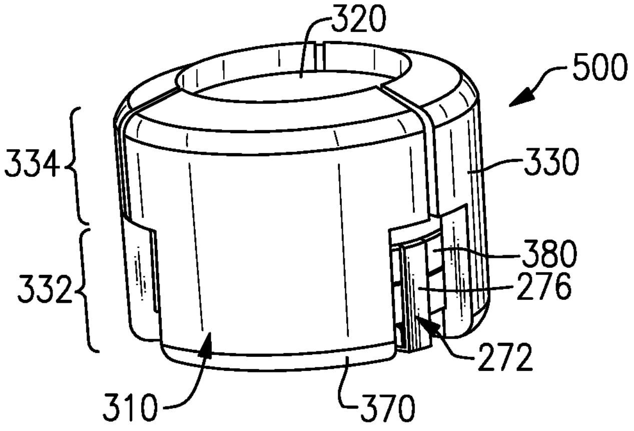
FIG. 19 is an example circulator according to aspects of the present disclosure.

Aspects of the present disclosure also relate to an improved circulator housing. The circulator housing houses the circulator assembly 200 described above. FIG. 19 shows an example circulator 500 according to aspects of the present disclosure. Like the known housing shown in FIG. 5, the housing 310 comprises a plurality of curved side portions 330 and the side portions 330 extend from a base 370. The housing further comprises a cover 320. Thus, the housing 310 largely covers the circulator assembly 200.

Referring to FIG. 19, the configuration of the side portions 330 of the housing 310 is significant. The side portions 330 extend along the axis of the circulator assembly 200. They are curved around the axis of the circulator assembly 200 to follow the circular periphery of the circulator assembly 200. The side portions 330 include a first section 332 and a second section 334. The first section 332 extends around the portion of the circulator assembly 200 that is, in use, slightly above and below or along that which the main body 276 of the elongate portion 272 of the conductor 270 extends. The second section 334 extends around above or spaced from the portion of the circulator assembly 200 that is, in use, above or not containing the main body 276 of the elongate portion 272 of the conductor 270. Significantly, the second section 334 extends further around part of the periphery of the circulator housing 310 than the first section 332. Neighboring first sections 332 are, therefore, separated by a gap that is wider than a gap separating neighboring second sections 334. In other words, the larger spacing between neighboring first sections 332 provides a window 380 or opening through which the elongate portion 272 of the conductor 270 projects. The spacing between second sections 334 is smaller, and indeed substantially smaller, than that required to allow the elongate portion 272 of the conductor 270 to project through. As discussed above with reference to FIG. 6 and the gaps 360 between the side portions 330 of known housings 310, the width of the gaps 360 for known housings 310 are dependent on the frequency at which the circulator 300 operates. However, gaps 360 with a width between 20% and 37% of the diameter of the housing 310 are considered sufficient for the elongate portions 272 of conductors 270 to project through. The width of the gap separating neighboring first sections 332, therefore, ranges between 20% and 37% of the diameter of the housing 310. The width of the gap separating neighboring second sections 334 ranges between 0.35 mm and 0.5 mm. A circulator assembly 200 (such as that shown in FIG. 7) is disposed within the circulator housing 310 such that said second sections 334 of the side portions 330 extend around the magnet 240. The gaps between neighboring first sections 332 have a greater width than a width of the elongate portions 272 of the conductor. The elongate portions 272 are disposed between neighboring first sections 332 such that the first sections 332 of the side portions 330 extend around a periphery of the circulator assembly 200 but leave the elongate portions 272 exposed. The gaps between neighboring second sections 334 have a smaller width than the width of the elongate portions 272. In this way, the circulator housing 310 according to aspects of the present disclosure provides more coverage around the magnet 240 than known configurations. The gaps between neighboring second sections 334 are ideally as small as possible such as to almost fully encapsulate the magnet 240 whilst still having sufficient width to facilitate folding the side portions over at least part of the cover 320 for manufacturing purposes. The gaps further facilitate manufacturing the side portions 330 of the housing 310 using progressive die stamping.

Figure 20:
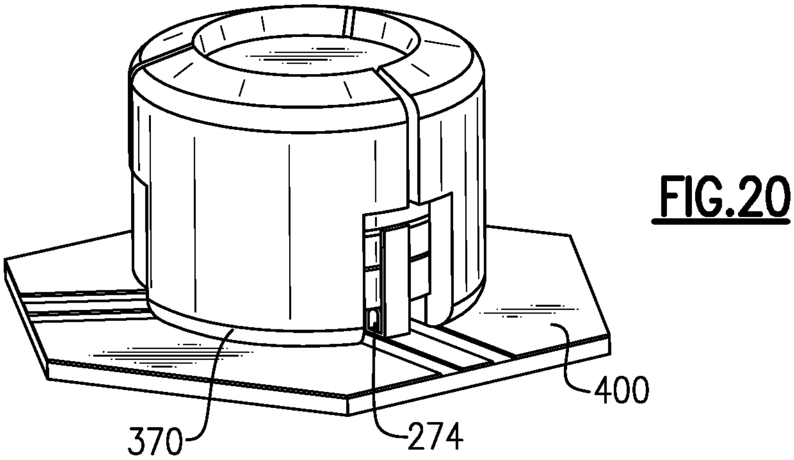
FIG. 20 is the circulator shown in FIG. 19 disposed on a PCB.

FIG. 20 shows the circulator 500 disposed on a PCB 400 such that the circulator 500 and the PCB 400 form part of a wider electrical device. Due to the difference in material thickness of the circuit 270 and the housing 310, the circuit 270 needs to be adjusted to make good electrical connection with the PCB 400. To account for the thickness of the base 370 of the housing 310, the distal end sections 274 of the elongate portions 272 of the conductor 270 are configured to span the height of the base 370 such that an electrical connection can be established between the PCB 400 and the circulator 500 via said distal end sections 274. FIGS. 10 to 14 show example configurations implemented to achieve this. As explained above, these configurations also serve the function of exerting a force on the PCB 400 and magnet 230. In FIGS. 10 to 13, the distal end sections 274 are bent such as to span the height of the base 370 and establish contact with the PCB 400. In FIG. 14, the distal end sections 274 are attached to a block 280 such that they span the height of the base 370 and establish electrical contact with the PCB 400. The block 280 has a height similar to that of the height of the base 370 such that by wrapping the distal end section 274 of an elongate portion 272 of the conductor 270 around the block 280, the distal end section 274 comes into contact with the PCB 400.

Figure 21:
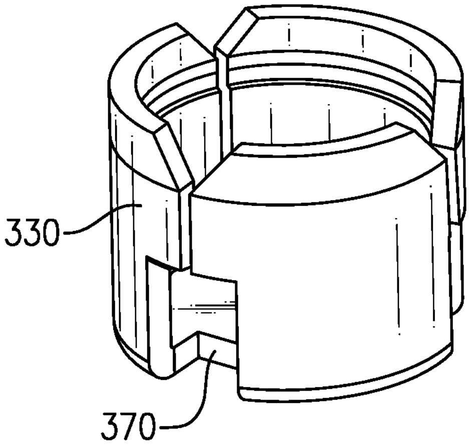
FIG. 21 is the base and side portion configuration for the circulator housing shown in FIGS. 19 and 20 prior to assembly.

Aspects of the present disclosure also relate to a method of assembling or manufacturing a circulator 500. Referring to FIGS. 7, 19, 20 and 21, the method involves disposing a cover 320 (also known as a lid) on the circulator assembly 200. The cover is disposed on a side of the magnet 240 opposing the grounding plane 260 to form a stacked arrangement of components of the circulator assembly 200 with the cover 320, which is known in the art as a stack up. The stack up is then disposed within the base 370 and side portion 330 configuration shown in FIG. 21. The stack up is arranged such that the elongate portions 272 of the conductor 270 are disposed between neighboring first sections 332 of the side portions 330 and the second sections 334 extend around a periphery of the magnet 240 (the case wraps around the top magnet 240). The side portions 330 are configured to bend. In other words, the housing shown in FIG. 21 is uncrimped, but readily crimpable. Once the stack up has been placed into the uncrimped housing, the uncrimped housing is compressed down using a press, such that the side portions 330 bend to fold over at least part of the cover 320 to crimp it. This secures the stack up within the housing 310, forming the overall circulator unit. Like in known circulators 300, the base 370, side portions 330, and cover 320 are formed prior to assembly using progressive die stamping and are formed from a suitable material for this process such as cold rolled steel.

Figure 22:
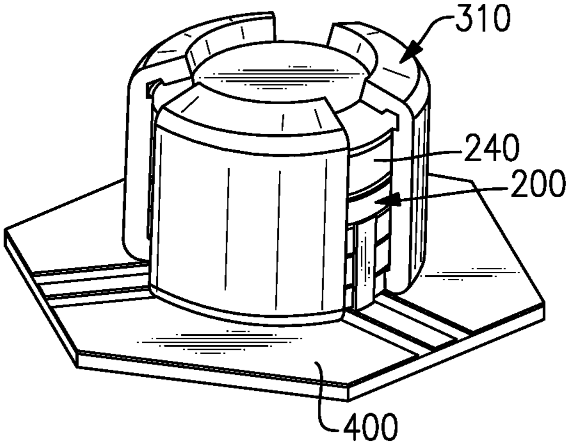
FIG. 22 is the circulator assembly shown in FIGS. 7 to 9 disposed within a known circulator housing.
Figure 23:
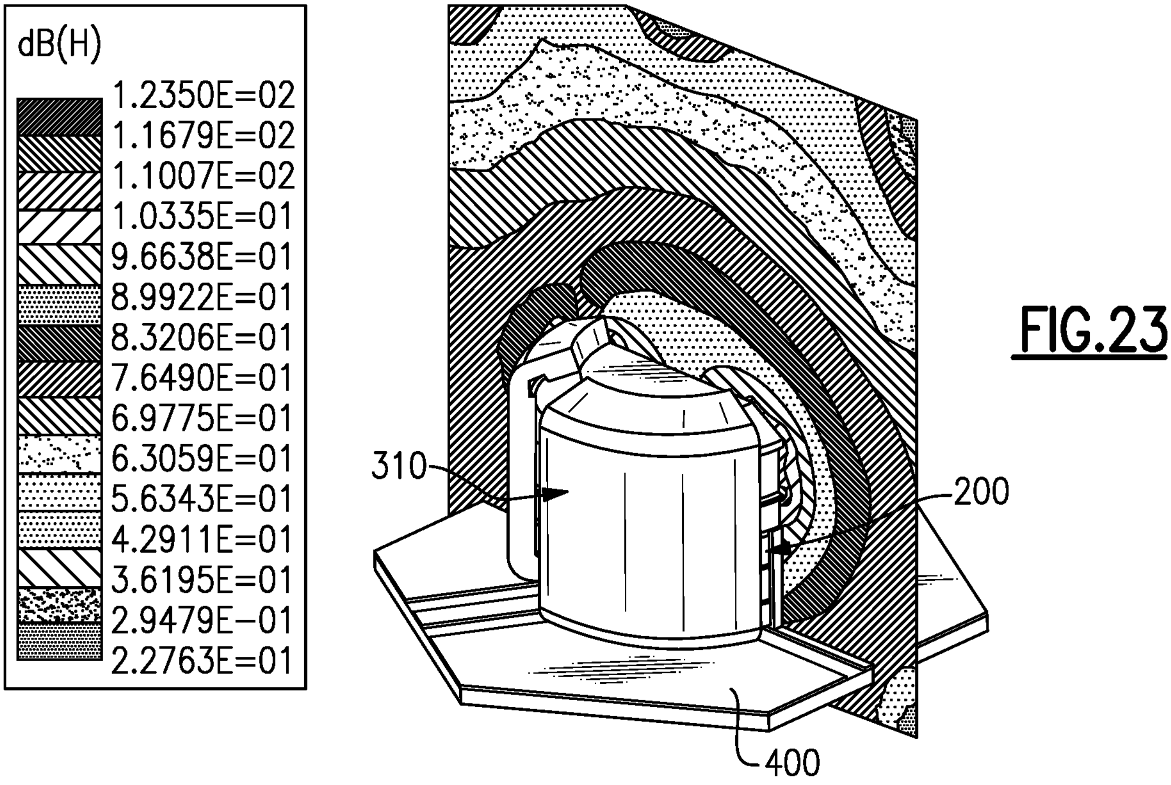
FIG. 23 is a magnetostatic simulation of the circulator shown in FIG. 22.
Figure 24:
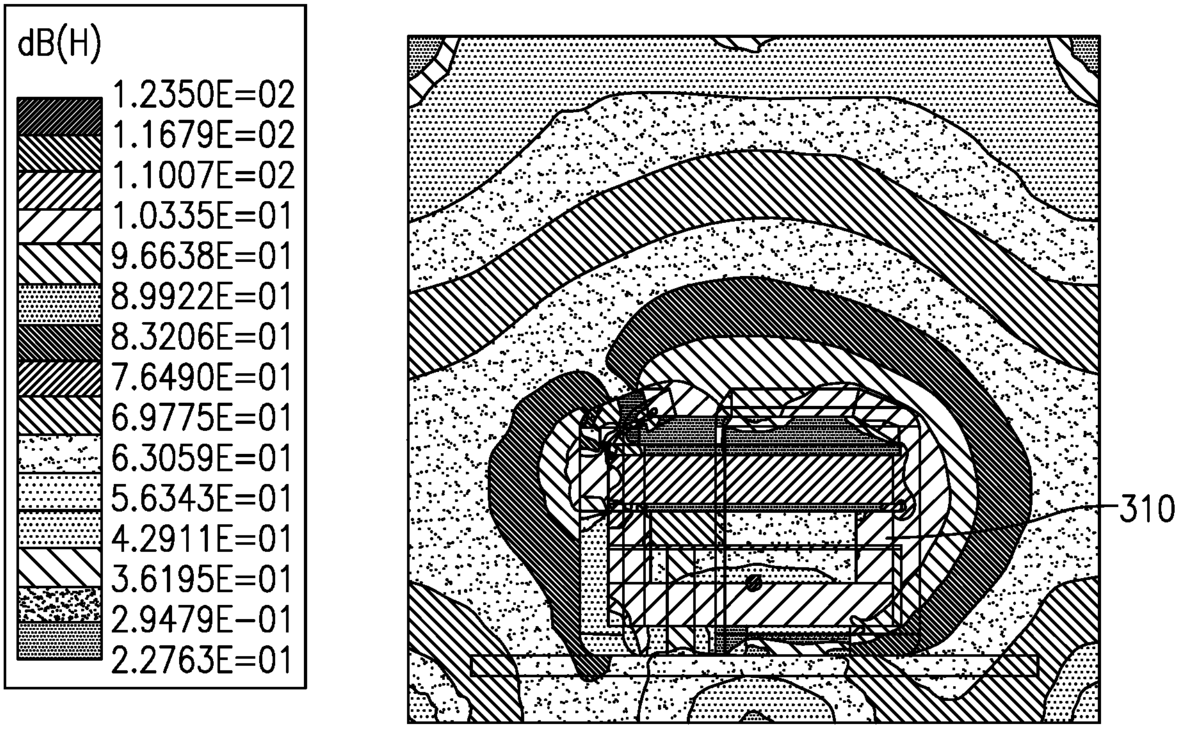
FIG. 24 is a magnetostatic simulation of the circulator shown in FIG. 22.
Figure 25:
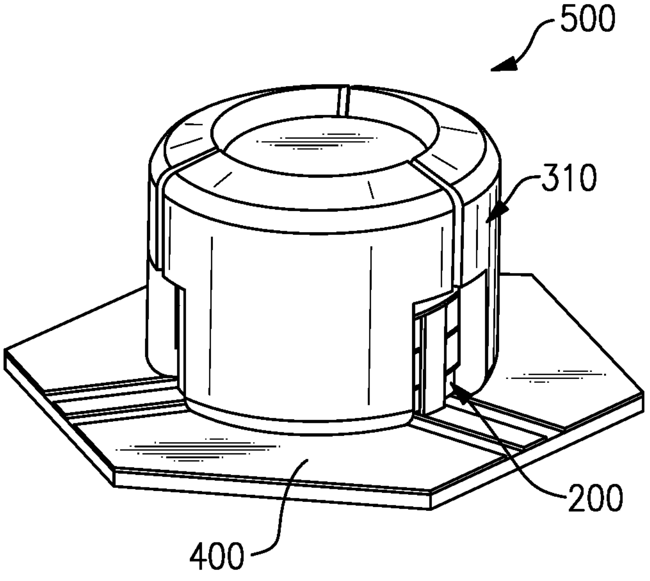
FIG. 25 is the circulator shown in FIGS. 19 and 20.
Figure 26:
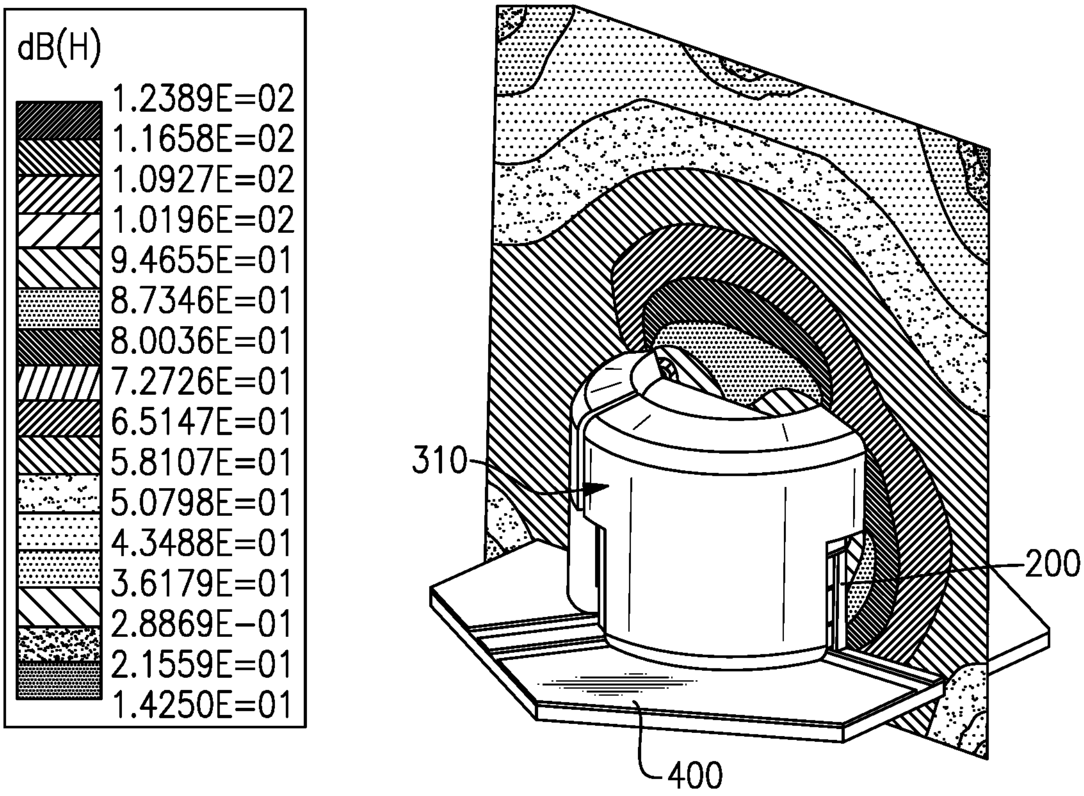
FIG. 26 is a magnetostatic simulation of the circulator shown in FIG. 25.
Figure 27:
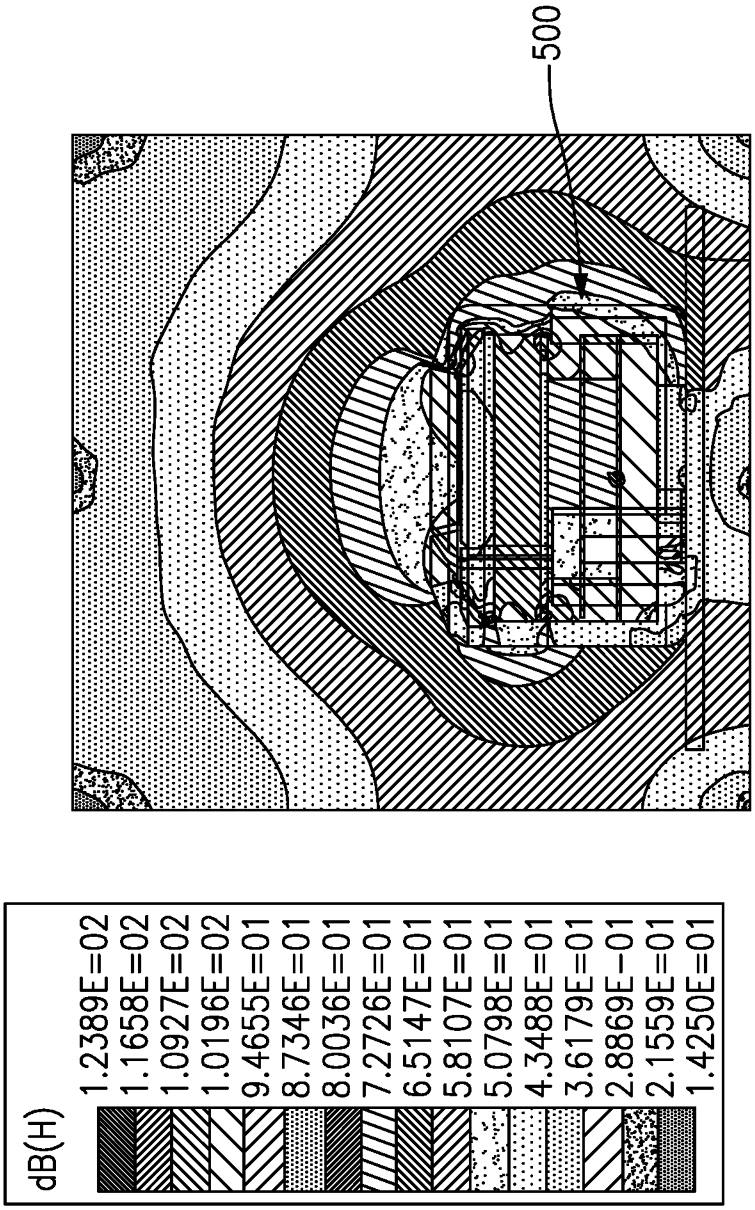
FIG. 27 is a magnetostatic simulation of the circulator shown in FIG. 25.

According to some aspects of the present disclosure, a circulator is provided with improved manufacturability. This is explained as follows initially with reference to a known arrangement. FIG. 22 shows circulator assembly 200 disposed within an example housing 310 in which the gap between side portions 330 of the housing 310 is the same width along the whole span of the housing 310 to accommodate the elongate portions 272. It is equivalent to known housing 310 configurations wherein a pin frame 350 is used. FIGS. 23 and 24 show magnetostatic simulations for such a configuration. FIG. 25 shows an example circulator assembly 200 such as that shown in FIG. 7 disposed within an example housing 310 according to aspects of the present disclosure, where the gaps between neighboring first sections 332 of the side portions 330 are wider than the gaps between neighboring second sections 334. FIGS. 26 and 27 show magnetostatic simulations for such a configuration. Comparing FIGS. 23 and 26, for example, in FIG. 23 the magnet 240 is exposed, allowing the magnetic field to extend further from the housing, whereas the improved housing 310 shown in FIG. 26 reduces the magnetic field intensity outside of the housing 310. This is because the improved housing 310 wraps around the top magnet 240, reducing the magnetic field intensity outside the housing as the magnetic return path is improved. The circulator housing 310 may therefore increase the magnetic isolation between units such that attraction between units forming part of a wider electrical device on a PCB 400 is reduced.

Circulators according to aspects of the present disclosure operate in the frequency range 650 MHz to 12 GHz. Preferably, the circulator 500 is used in Sub-6 GHz (or below 6 GHz) infrastructure. It also has applications in the 8 to 12 GHz range, in which pins 340 in known circulators act as antennas, leading to lossy signals. Typically, in these ranges, the pins designed for a housing have to be used on a very specific PCB with a certain trace width feeding it and a certain dielectric constant. Mounting the housing and pins on a different PCB causes poor electrical performance. This is partly due to the pins not having a good ground reference. In the circulator 500 according to aspects of the present disclosure, the elongate portions 272 of the conductor 270 are well grounded relative to the side portions 330 of the housing 310. It is, therefore, possible to use the circulator 500 with a range of PCBs 400 by strategically cutting and tuning the circulator 500 to match the PCB 400. By cutting the width of the elongate portion 272, the impedance can be matched. There is no need to redesign pins 340 for different PCBs 400 as the need for pins 340 has been eliminated, as explained above.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A circulator, comprising:

a grounding plane including a first side and a second side;

a magnet disposed on the first side of the grounding plane;

a ferrite-based disk disposed on the second side of the grounding plane; and a conductor disposed on a side of the ferrite-based disk opposing the grounding plane and configured to exert a force on the magnet in a direction towards the ferrite-based disk, the conductor including an elongate portion, the elongate portion having a distal end section projecting inwardly adjacent to a side of the magnet opposing the grounding plane.

2. The circulator of claim 1 wherein the distal end section of the elongate portion of the conductor is bent such as to exert the force on the magnet.

3. The circulator of claim 2 wherein the magnet includes an electrically insulating portion.

4. The circulator of claim 3 wherein the magnet has no electrical conductivity such as to form the electrically insulating portion.

5. The circulator of claim 3 wherein the magnet includes a ring of electrically non-conductive material disposed around a periphery of the magnet such as to form the electrically insulating portion, the electrically non-conductive material being a dielectric, ceramic, or high temperature plastic.

6. The circulator of claim 3 wherein the magnet includes a layer of electrically insulating material disposed on a side of the magnet opposing the ferrite-based disk such as to form the electrically insulating portion, the layer of electrically insulating material being a ceramic or a high-temperature material.

7. The circulator of claim 6 wherein the layer of electrically insulating material is a shim.

8. The circulator of claim 3 wherein the bent distal end section of the elongate portion of the conductor is configured to be in contact with the electrically insulating portion of the magnet such as to exert the force.

9. The circulator of claim 1 further comprising a part at the distal end section of the elongate portion of the conductor located adjacent to the side of the magnet opposing the grounding plane such as to exert the force on the magnet.

10. The circulator of claim 9 wherein the part is a block.

11. The circulator of claim 9 wherein the part is an electrical insulator.

12. The circulator of claim 9 wherein the distal end section of the elongate portion is wrapped around a portion of the part.

13. The circulator of claim 9 wherein the part includes a high-temperature material.

14. The circulator of claim 1 wherein the configuration to exert the force on the magnet exerts a force on a printed circuit board in a direction opposing the force on the magnet.

15. The circulator of claim 1 wherein the ferrite-based disk includes a ring of dielectric material disposed around a periphery of the ferrite-based disk.

16. The circulator of claim 1 further comprising a second ferrite-based disk disposed on a side of the conductor opposing the ferrite-based disk disposed on the second side of the grounding plane, a second grounding plane disposed on a side of the second ferrite-based disk opposing the conductor, and a second magnet disposed on a side of the second grounding plane opposing the second ferrite-based disk.

17. The circulator of claim 1 wherein the elongate portion of the conductor is configured to bend such that its distal end section projects inwardly adjacent to a side of the magnet opposing the grounding plane.

18. A circulator, comprising:

a grounding plane including a first side and a second side;

a magnet disposed on the first side of the grounding plane;

a ferrite-based disk disposed on the second side of the grounding plane;

a conductor disposed on a side of the ferrite-based disk opposing the grounding plane, the conductor including an elongate portion, the elongate portion having a distal end section projecting inwardly adjacent to a side of the magnet opposing the grounding plane; and a circulator housing including a plurality of side portions, the plurality of side portions having first sections and second sections, the second sections extending further around a periphery of the housing than the first sections such that a gap between neighboring first sections is wider than a gap between neighboring second sections.

19. The circulator of claim 18 wherein a width of the gap between neighboring first sections is between 20% and 37% of a diameter of the housing.

20. The circulator of claim 18 wherein the gap between neighboring second sections has a width between 0.35 mm and 0.5 mm.

21. The circulator of claim 18 wherein the gap between neighboring first sections has a greater width than a width of the elongate portion of the conductor.

22. The circulator of claim 21 wherein the elongate portion of the conductor is disposed between neighboring first sections.

23. The circulator of claim 18 wherein the gap between neighboring second sections has a smaller width than the width of the elongate portion of the conductor.

24. The circulator of claim 18 further comprising a second magnet arranged adjacent to the second side of the grounding plane, the second section of the plurality of side portions extending around the second magnet.

25. The circulator of claim 18 wherein the housing further includes a base, the distal end section of the elongate portion of the conductor being configured to span a height of the base of the housing.

26. A circulator housing, comprising:

a base;

a cover; and a plurality of curved side portions, the side portions including first sections, and second sections, the second sections extending further around a periphery of the housing than the first sections such that a gap between neighboring first sections is wider than a gap between neighboring second sections, the plurality of curved side portions being configured to fold over at least part of the cover such as to secure a circulator disposed within the housing.

* * * * *